United States Patent
More et al.

(10) Patent No.: US 7,281,086 B1
(45) Date of Patent: Oct. 9, 2007

(54) DISK QUEUE MANAGEMENT FOR QUALITY OF SERVICE

(75) Inventors: Sachin Suresh More, Westborough, MA (US); Yechiel Yochai, Lincoln, RI (US); Amnon Naamad, Brookline, MA (US); Adnan Sahin, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 290 days.

(21) Appl. No.: 11/143,813

(22) Filed: Jun. 2, 2005

(51) Int. Cl.
*G06F 12/00* (2006.01)

(52) U.S. Cl. .................... 711/112; 711/151; 711/154; 711/158; 711/169; 710/39; 710/40; 710/54

(58) Field of Classification Search ............. 711/112, 711/151, 154, 158, 169; 710/39, 40, 54
See application file for complete search history.

(56) References Cited

U.S. PATENT DOCUMENTS

| | | | |
|---|---|---|---|
| 5,220,653 A | 6/1993 | Miro | 718/107 |
| 5,469,560 A | 11/1995 | Beglin | 711/112 |
| 5,603,063 A | 2/1997 | Au | 710/52 |
| 5,828,902 A * | 10/1998 | Tanaka et al. | 710/39 |
| 6,112,265 A * | 8/2000 | Harriman et al. | 710/40 |
| 6,141,707 A | 10/2000 | Halligan et al. | 710/36 |
| 6,170,042 B1 | 1/2001 | Gaertner | 711/158 |
| 6,272,606 B1 * | 8/2001 | Dorricott et al. | 711/158 |
| 6,311,256 B2 | 10/2001 | Halligan et al. | 711/158 |
| 6,378,036 B2 | 4/2002 | Lerman et al. | 711/112 |
| 6,434,631 B1 * | 8/2002 | Bruno et al. | 710/6 |
| 6,487,562 B1 | 11/2002 | Mason, Jr. et al. | 707/205 |
| 6,665,740 B1 | 12/2003 | Mason, Jr. et al. | 710/6 |
| 6,721,789 B1 | 4/2004 | DeMoney | 709/219 |
| 6,754,897 B1 | 6/2004 | Ofer et al. | 718/103 |
| 6,839,817 B2 | 1/2005 | Hyde, II et al. | 711/154 |
| 6,871,011 B1 | 3/2005 | Rahman et al. | 386/125 |
| 2003/0149838 A1 * | 8/2003 | Mowery et al. | 711/113 |

* cited by examiner

*Primary Examiner*—Stephen C. Elmore
(74) *Attorney, Agent, or Firm*—BainwoodHuang

(57) ABSTRACT

A mixed queue method for managing storage requests directed includes a low-priority request queue on which all low-priority requests are placed and where they are subject to throughput optimization by re-ordering. When a high-priority request limit has not been reached, high-priority requests are placed on a high-priority request queue where they are executed in a pre-emptive manner with respect to the queued low-priority requests, thus experiencing reduced access time. When the high-priority request limit has been reached, the high-priority requests are placed on the low-priority request queue, such that the high-priority requests are included in the throughput optimization along with the low-priority requests on the request queue. Starvation of the low-priority requests is avoided, and the overall throughput of the disk drive is maintained at a relatively high level. The high-priority request limit can be realized in several ways, such as by monitoring the number of outstanding high-priority requests or the rate at which high-priority requests are issued to the disk drive.

19 Claims, 6 Drawing Sheets

DISK QUEUE MANAGEMENT FOR QUALITY OF SERVICE

BACKGROUND

The present invention is related to the field of data storage systems.

In the field of data storage systems, it is common to maintain a queue of storage requests inside a disk drive. Beyond its inherent effect of buffering the requests to help manage the timing of execution of the requests, a request queue also plays a significant role in achieving optimal performance of disk drives. Due to the nature of the mechanisms for accessing data on a disk drive, the overall performance for a given set of storage requests can vary widely depending on the order in which they are executed. If the requests are executed in an order that mimics the direction of rotation of the disk and preferred seek patterns, then the overall performance may be quite optimal. If the requests are instead executed in a more random order, significantly lower performance may be obtained. Thus, one important role of request queues in modern storage systems is to store a number of requests that are subject to re-ordering by an optimizing scheduler. As described in more detail below, in such systems the request throughput (number of requests per unit time) generally increases as the queue length (number of pending storage requests in the queue) increases up to an asymptotic level.

One drawback of a large request queue in a disk drive, however, is that the response time or access time for the requests is increased. For many types of storage requests, a reasonable amount of increased latency is a small price to pay for the improvement in overall throughput. However, there are some types of requests that are more sensitive to access time. As an example, when a block of data is being read from a storage system that employs caching, it is important in the case of a "miss" (i.e., a failure to find the block in the cache) to retrieve the block from the disk as quickly as possible. With a well-designed cache, the rate of such requests is generally low, and therefore the storage system performance is not particularly sensitive to the throughput of such requests. Rather, these requests require execution by the disk drive in the minimum amount of elapsed time. In the description herein, requests that require low access time are referred to as "high-priority" or HP requests, in contrast to relatively "low-priority" or LP requests for which throughput is a more important performance parameter.

Disk drives have been known to employ two separate queues in order to improve the access time experienced by high-priority requests when an optimizing scheduler is employed to improve overall throughput. The optimizing scheduler looks at requests in the high priority queue and schedules the most appropriate storage request from that queue. If the high priority queue is empty, then it schedules the most appropriate storage request from the low priority queue. Such a configuration is effective in servicing storage requests from the high priority queue ahead of the storage requests in low priority queue.

SUMMARY

One shortcoming of the above-described two-queue approach, however, is the possibility that low-priority requests become "starved" for disk access at when the rate of high-priority requests becomes sufficiently high. It will be appreciated that if the high-priority request rate is high enough that there is always at least one high-priority request pending, then there is no opportunity for the disk drive to revert to processing low-priority requests in a normal fashion. In such a case, the low-priority requests actually time out in the low-priority queue, at which point they become high-priority requests and compete with normal high-priority requests for access to the disk drive. Thus the access time for the normal high-priority requests suffers. Additionally, if enough low priority storage requests get promoted to the high priority queue (via the timeout mechanism), the storage requests in the high priority queue (original requests in the high priority queue and the formerly low-priority requests) can timeout and are executed in their order of timeout, which may be far from an optimal order from the perspective of throughput, and thus the overall throughput of the disk is also reduced to substantially less than the maximum achievable value.

Additionally, there is an increasing trend in the data storage industry toward providing performance-differentiated storage services, generally referred to under the label of "quality of service" or QOS. As one tool in providing such differentiated services, storage vendors can implement different priorities that can be assigned to the storage requests of different customers or different classes of storage traffic. Under such an approach the disk drive needs to differentiate between storage requests in the service level, while avoiding the problem of starvation of the low-priority requests, so that an overall desired balance of performance for the various request types can be achieved.

To address these goals, a method is disclosed for managing storage requests directed to a disk drive, wherein the storage requests are divided into high-priority requests and low-priority requests. The high-priority requests generally require low response time, and the low-priority requests generally require high throughput. Generally, the method utilizes a mixed queuing approach that mimics the respective behaviors of single-queue systems and two-queue systems under different operating conditions, and thereby achieves a desired blend of the benefits of both.

The method includes the use of a low-priority request queue on which all low-priority requests are placed. According to the method, a high-priority request limit is established in one of many possible ways, some of which are described below. When the high-priority request limit has not been reached, high-priority requests are placed in the high-priority request queue. The high-priority request queue is the subject of priority selection such that requests on the high-priority request queue are executed by the disk drive ahead of requests on the low-priority request queue. In this manner, these high priority requests are given reduced access time as is desirable.

When the high-priority request limit has been reached, however, the high-priority requests are placed on the low-priority request queue, such that the high-priority requests compete with the requests on the low-priority request queue. Although the access time for these high-priority requests is much larger than for those requests executed via the high-priority request queue, the starvation of low-priority requests is avoided, and the overall throughput of the disk drive is maintained at a relatively high level. The manner of determining the high-priority request limit can be chosen to effect a desired transition point between the two modes of operation.

In one approach, the high-priority request limit can be a predetermined limit (such as one) on the number of high-priority requests that are outstanding for execution by the disk drive at any given instant. When a limit of one is utilized, a high-priority request is queued to the high-priority queue only when there is at most one outstanding high-priority request, and otherwise is queued to the low-priority queue.

Alternatively, the high-priority request limit can be implemented as a limit on the rate at which high-priority requests are executed by the disk drive, such as a predetermined number n of high-priority requests over some predetermined time interval. In yet another approach, the high-priority request limit can be implemented as a limit on the proportion of the high-priority requests that are placed on the high-priority queue. In this case, for every n high-priority requests that are placed on the high-priority queue, another m high-priority requests are placed on the low-priority queue. As a further refinement, the proportion can be dynamically adjusted as a function of the number of entries in the low-priority queue, such that the number of entries in the low-priority queue is maintained within a predetermined desired range.

The method is disclosed in the context of an integrated cache-disk array (ICDA) but can be used more generally in systems having a single initiator of storage requests and a disk drive using high- and low-priority queues.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
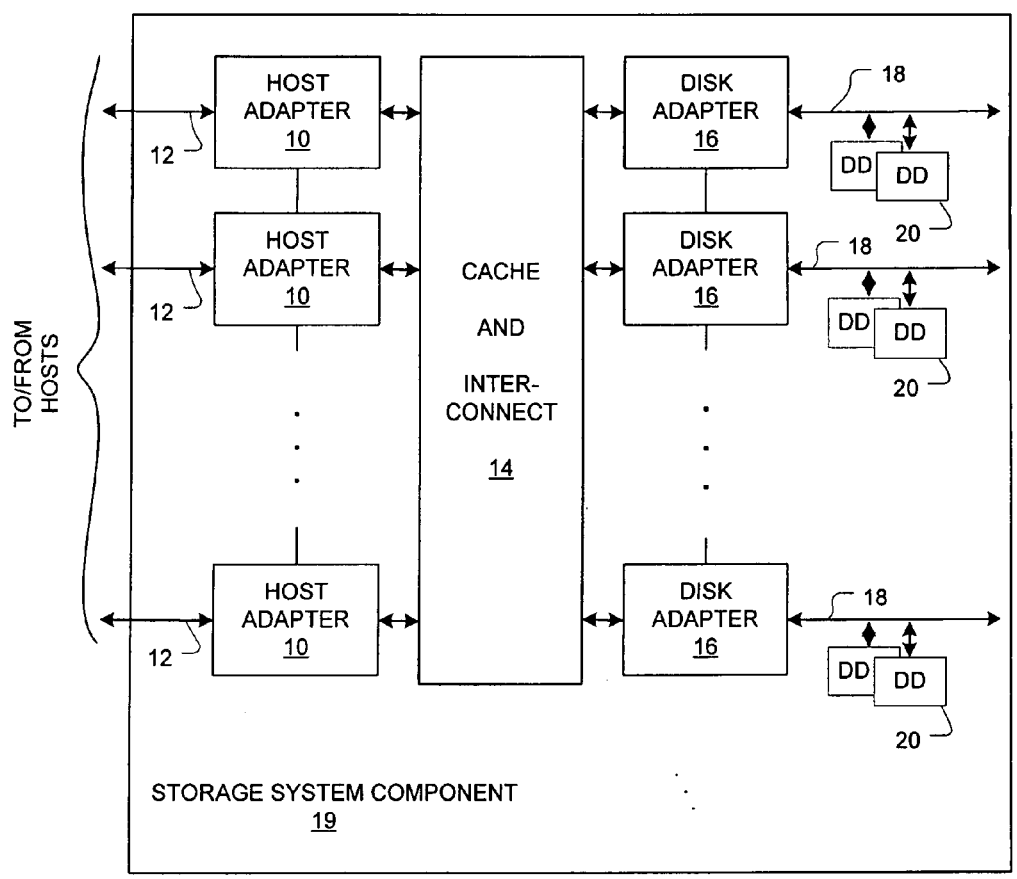
FIG. 1 is a block diagram of a data storage system incorporating disk queue management in accordance with the present invention.

FIG. 1 shows a data storage system for storing data for a number of host computers (or simply hosts). The host computers are coupled to respective host adapters 10 via respective interconnect buses 12, such as Fiber Channel or other high-speed storage interconnect buses. The host adapters 10 are coupled to cache and interconnect block 14, which in turn is coupled to disk adapters 16. Each disk adapter 16 interfaces to one or more storage buses 18 to which a plurality of disk drives (DD) 20 are connected. The storage buses 18 may be Small Computer System Interconnect (SCSI) buses for example. In the illustrated embodiment, the above-described components are part of a storage system component 19 that may include a distinct physical housing. An example of such a storage system component is a Symmetrix® storage system sold by EMC Corporation.

Figure 2:
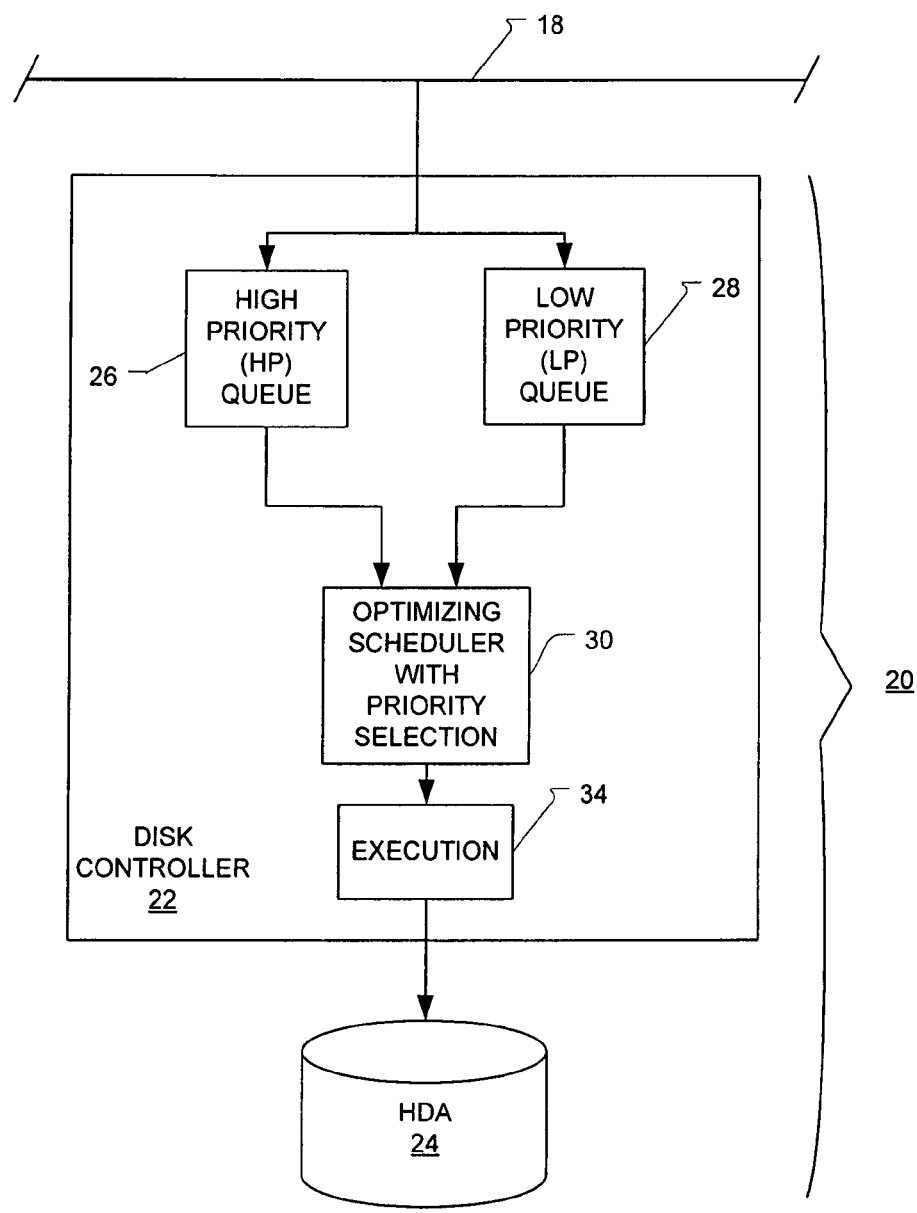
FIG. 2 is a block diagram of a disk drive in the data storage system of FIG. 1.

FIG. 2 shows the pertinent details of a disk drive 20, which includes a disk controller 22 and a head-disk assembly (HDA) 24. The details of the HDA 24 have been omitted for clarity, but generally it includes a magnetic disk on which information is stored, a read/write head assembly that moves a magnetic transducer over the surface of the disk to read and write data at selected locations, motors and positioning elements for the disk and read/write head assembly, and other related electromechanical components as generally known in the art. Some HDAs may incorporate multiple disks and read/write head assemblies for greater storage capacity. The disk controller 22 implements the electrical circuitry for interfacing to the storage bus 18 and the HDA 24 and for controlling the transfer of data therebetween, as well as other related functions such as initialization, configuration, and diagnostics, as is also generally known in the art. As shown in FIG. 2, the disk controller 22 includes a high-priority (HP) queue 26 and a low-priority (LP) queue 28, as well as an optimizing scheduler 30 and request execution logic 34. The optimizing scheduler 30 includes priority selection functionality by which it first examines the HP queue 26 for a request to execute before executing any pending requests on the LP queue 28. These various components are involved with receiving and executing storage requests sent to the disk drive 20 by the respective disk adapter 16 of FIG. 1, as described in more detail below.

The HP queue 26 and LP queue 28 provide separate paths by which a storage request received by the disk controller 22 is provided to the request execution logic 34 for execution. Generally speaking, high-priority requests require minimal access time, i.e., minimal overall delay from the receipt of such a request to the completion of the request, whether that is returning read data from the disk or writing data to the disk. Examples of high-priority requests in the storage system component 19 (FIG. 1) include prefetch reads and "read misses", i.e., read requests for data that has been requested by a host but not found in the cache memory within the cache and interconnect block 14. Similarly, so-called "destage writes" of data from the cache memory to the disk can become high-priority when there is a lot of data to be written to the disk (at which point the system enters a high priority destage mode). Examples of low-priority requests include various RAID-related requests, data scrubbing operations, etc.

Thus, the priority selection logic within the optimizing scheduler 30 operates to select a request from the HP queue 26 when one or more requests are present, and only selects a request from the LP queue 28 when the HP queue 26 is empty. By this mechanism, the high-priority requests are given the best (i.e. minimal) access time or response time possible. However, under some conditions this type of operation can actually be counterproductive, so the disk adapter 16 actively manages its use of the HP queue 26 and LP queue 28 as described below in response to operating conditions.

Figure 3:
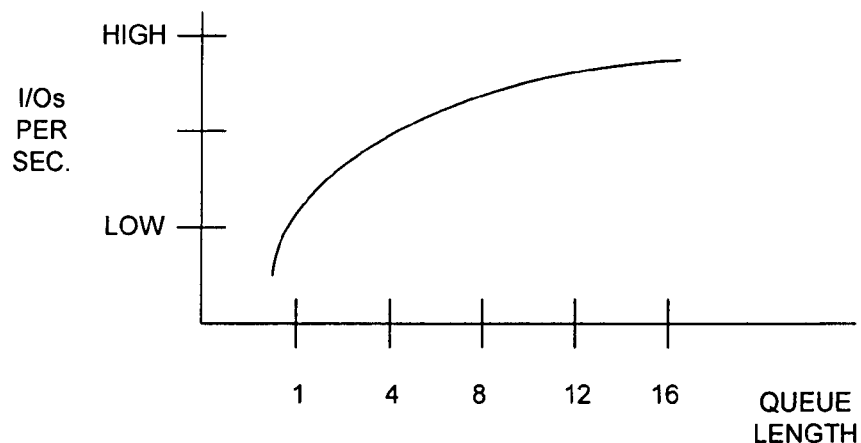
FIG. 3 is a plot of storage request throughput as a function of queue length in a disk drive.

FIG. 3 is a graph that generally illustrates the effect of the optimizing scheduler 30 as known in the art. When the average number of storage requests in a disk queue is low, for example one, the disk drive 20 is capable of executing a relatively low number of storage requests per unit time, shown as "I/Os per sec." (i.e., input/output operations per second). When there are more entries in the queue on average, the disk drive 20 can execute a greater number of storage requests per second. This phenomenon is due to the structure of the data on the disk, as now described with reference to the simplified example of FIG. 4.

Figure 4:
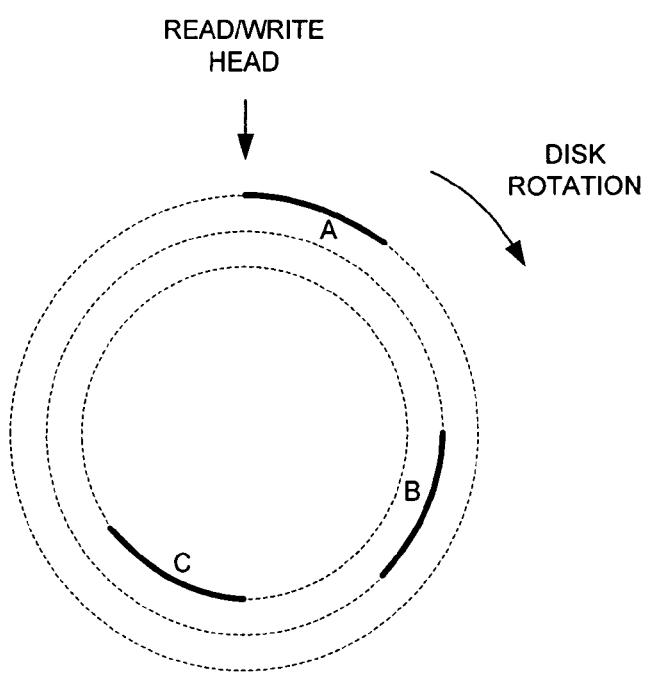
FIG. 4 is a diagram depicting an example layout of three data blocks on a disk in the data storage system of FIG. 1.

In FIG. 4, there are three blocks of data A, B and C stored on the disk in the manner shown, i.e., all on different tracks and offset from each other by approximately ¼ rotation. The read/write head is located at the 12:00 position, and the disk rotates clockwise such that the blocks pass the read/write head in the order C, B, A. In general, the process of reading or writing data to/from a disk involves (1) moving the read/write head radially to the correct track ("seeking"), waiting for the disk to rotate to the beginning of the data block, and then reading or writing the data to/from the disk in a stream as a portion of the track rotates past the head. As illustrated in the tables below, the total amount of time it takes to read or write all three blocks A, B and C, is highly dependent on the order in which the reads/writes occur:

| Case 1: A, B, C in sequence | |
|---|---|
| Delay component | Delay amount |
| Rotate to A | 7/8 rotation |
| Read/write A | 1/8 rotation |
| Seek and rotate to B | 5/8 rotation |
| Read/write B | 1/8 rotation |
| Seek and rotate to C | 5/8 rotation |
| Read/write C | 1/8 rotation |
| Total | 2 1/2 rotations |

| Case 2: C, B, A in sequence | |
|---|---|
| Delay component | Delay amount |
| Rotate to C | 3/8 rotation |
| Read/write C | 1/8 rotation |
| Seek and rotate to B | 1/8 rotation |
| Read/write B | 1/8 rotation |
| Seek and rotate to A | 1/8 rotation |
| Read/write A | 1/8 rotation |
| Total | 1 rotation |

It is assumed in the above that each seek can be accomplished within the indicated rotation interval.

The above tables illustrate that if the requests are received in the order A, B and C and they must be done in that order, then the total time required is 2.5 revolutions of the disk. If they are done in the reverse order, then only 1 revolution of the disk is required. When there are very few requests in either queue 26 or 28 on average, the optimizing scheduler 30 is forced to schedule the requests closer to their order of arrival. When there are more requests in a queue 26 or 28, there are more chances for the optimizing scheduler 30 to re-order the queued requests to take advantage of the layout of the requested data on the disk, so that the average delay per request is reduced and the number of requests executed per second is increased. Thus, the optimizing scheduler 30 operates essentially to re-order storage requests such that they are executed by the request execution logic 34 and HDA 24 in a more optimal order than the order in which they are received. The optimizing scheduler 30 does this in conjunction with both the HP queue 26 and LP queue 28 individually. Each queue 26 and 28 preferably holds a sufficient number of requests to enable the optimizing scheduler 30 to be effective.

Figure 5:
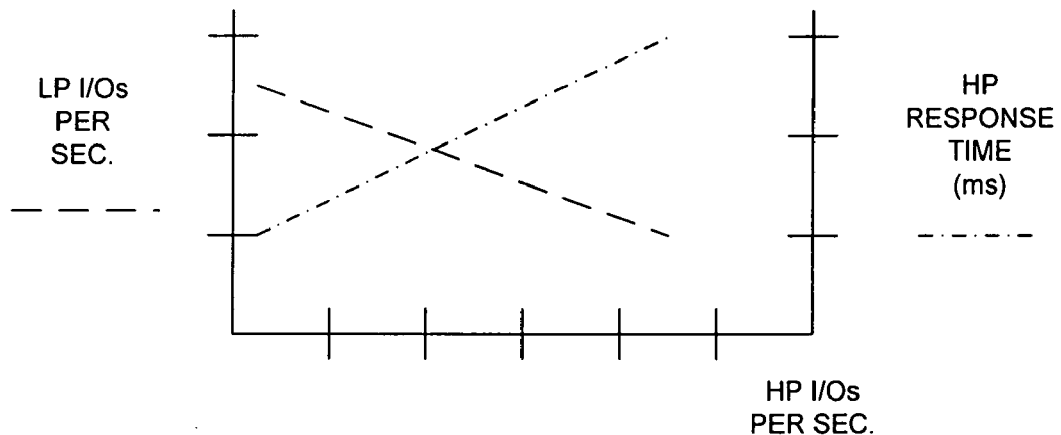
FIG. 5 is a plot showing the dependence of throughput and response time on the rate of high-priority storage requests in a data storage system employing one request queue.
Figure 6:
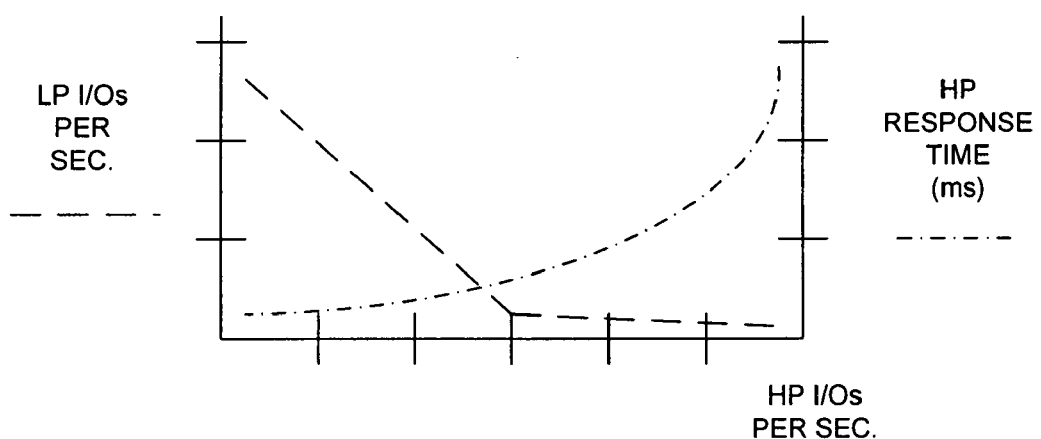
FIG. 6 is a plot showing the dependence of throughput and response time on the rate of high-priority storage requests in a data storage system employing two request queues.

FIGS. 5 and 6 generally illustrate certain disk drive performance results as measured by (1) response time for high-priority (HP) requests, and (2) throughput (I/Os per second) for low-priority (LP) requests. These values are plotted as a function of the rate of HP requests. FIG. 5 shows the results when a single queue is used for both HP and LP requests (i.e., the HP and LP requests are merged together into the single queue). As shown, the general trend for LP throughput is downward as the number of HP I/Os per second increases, and the general trend for HP response time is upward as the number of HP I/Os per second increases. While the LP throughput starts reasonably high and degrades gracefully, the HP response time starts relatively high (⅓ of maximum) and grows as the rate of HP I/Os per second increases. Thus, the response time provided to HP requests in a one-queue approach is generally not favorable.

FIG. 6 illustrates analogous results when two queues are used, one for the HP requests and one for the LP requests. The HP response time starts at a much lower value and stays low up to moderate HP request rates. Thus, when the rate of HP I/Os is low, this configuration can provide both low HP response time and relatively high LP throughput. However, as shown the LP throughput falls off much more rapidly than for the one-queue case. At an HP I/O rate of about half of maximum, the LP throughput diminishes to a very low value. In this operating mode, the LP requests are being starved, and their scheduling reverts to "timeout scheduling", i.e., an LP request is executed only when it has sat in the LP queue 28 for some predetermined long timeout interval. The rate of execution of LP requests thus becomes equal to the inverse of the timeout value.

The results in FIGS. 5 and 6 demonstrate the following:
1. The two queue scheme is better for HP response time, and provides good LP throughput only at low HP request rates.
2. The one queue scheme is better for throughput at higher HP request rates.

Based on these results, a "mixed queue" technique is proposed that exhibits the behavior of a two-queue scheme at low HP request rates and the behavior of a one-queue scheme at higher HP request rates. This approach achieves the benefits of the two-queue scheme when possible (i.e., at low HP request rates), but avoids the throughput penalty normally imposed by the two-queue scheme at higher HP request rates.

Figure 7:
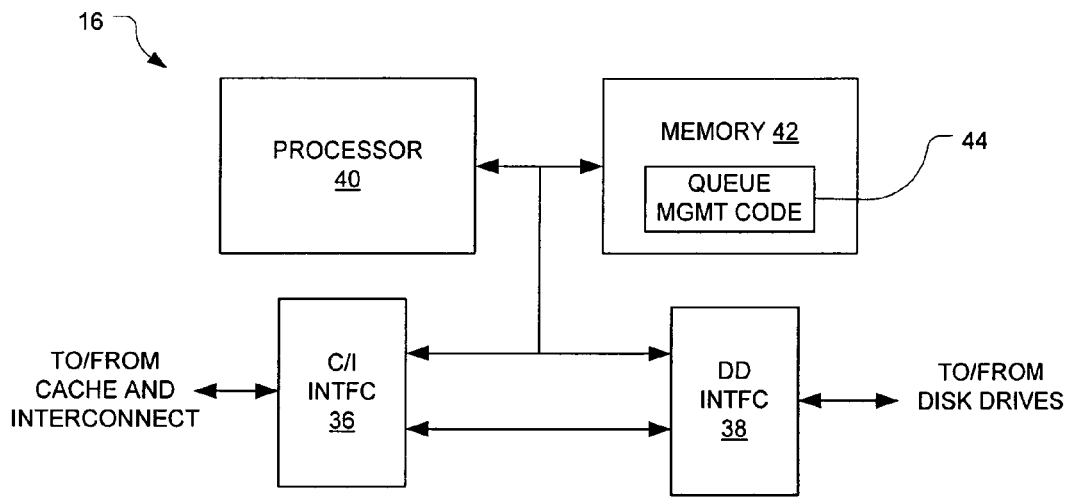
FIG. 7 is a block diagram of a disk adapter for a set of disk drives in the data storage system of FIG. 1.

FIG. 7 shows the organization of a disk adapter 16 that implements the proposed mixed-queue scheme. The primary datapath is provided by cache/interconnect interface logic 36 and disk drive (DD) interface logic 38. A processor 40 and associated memory 42 provide control functionality. In particular, the memory 42 includes queue management code 44 that is executed by the processor 40 as a queue management process for managing the use of the HP queue 26 and LP queue 28 of the disk controller 22 (FIG. 2). As described below, the queue management process effects the above-referenced mixed queue technique to make the associated disk drive 20 more adaptive to variation in the rate of HP requests.

Figure 8:
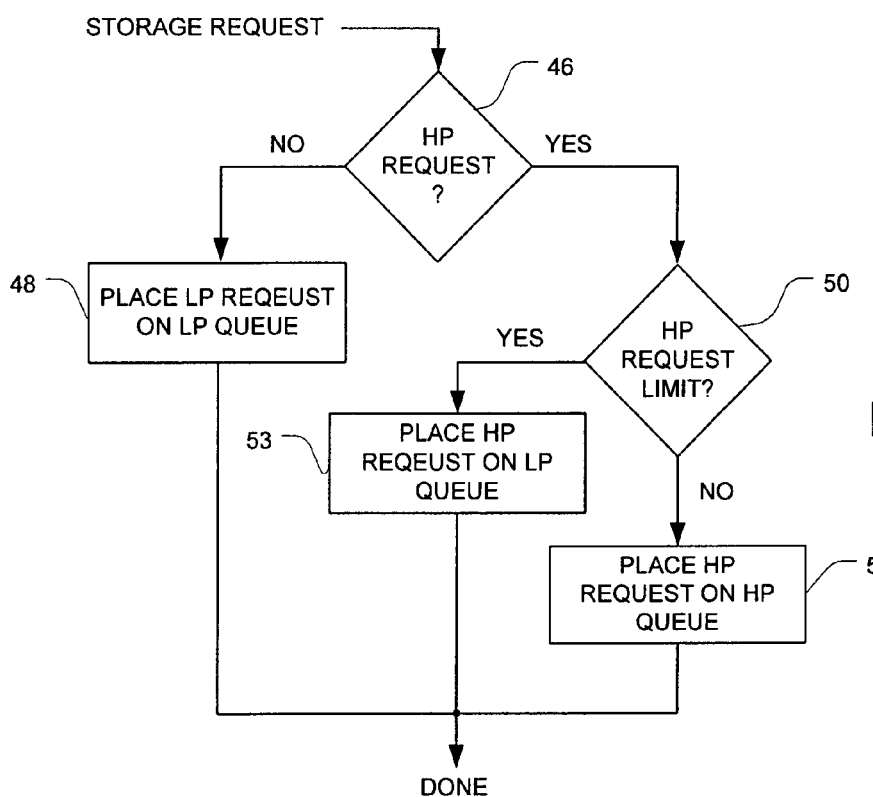
FIG. 8 is a flow diagram of a queue management method performed by the disk adapter of FIG. 7 for managing queues of storage requests in the disk drive of FIG. 2 in accordance with a mixed queuing technique.

FIG. 8 illustrates the queue management process. Upon receiving a storage request via the cache and interconnect block 14 (FIG. 1) and the C/I interface logic 36 (FIG. 7), the processor 40 first determines at step 46 whether the storage request is a HP request. The classification of request types as HP or LP is described above. If the request is not an HP request, then at step 48 the request is placed on the LP queue 28 as an LP request. If at step 46 the processor 40 determines that the storage request is an HP request, then at step 50 the processor 40 determines whether an HP request limit has been reached. The HP request limit is a limitation on the issuance of HP requests to the disk drive 20 in the two-queue mode of operation, and can be realized in one of several ways as described below. If the HP request limit has not been reached, then at step 52 the processor 40 places the HP request on the HP queue 26. As described above, the priority selection function of the optimizing scheduler 30 ensures that the HP request is executed ahead of any requests in the LP queue 28 to minimize the response time for the HP request.

If at step 50 the processor 40 determines that the HP request limit has been reached, then at step 53 the HP request is placed on the LP queue 28 instead of the HP queue 26. Once this has occurred, the HP request is treated by the disk controller 22 the same as the LP requests in the LP queue 28. In particular, the optimizing scheduler 30 includes any HP requests residing in the LP queue 28 in its optimization of the requests in the LP queue 28, such that the HP requests are executed along with the LP requests in a throughput-optimizing order. It will be appreciated that any HP requests placed on the LP queue 28 effectively lose their high-priority characteristic insofar as requiring a low response time—the optimizing scheduler 30 generally ignores response time as a metric in scheduling the requests in the LP queue 28. It is assumed that the resulting response time penalty has been deemed acceptable within the storage system as the price of maintaining throughput when the HP request limit has been exceeded. When the HP request limit has been exceeded, new storage requests are processed more in the manner of the one-queue system as described above.

One way of realizing the HP request limit is to permit no more than some number of HP requests to be outstanding for execution by the disk drive 20 at a given time. In one embodiment, this limit is one.

Figure 9:
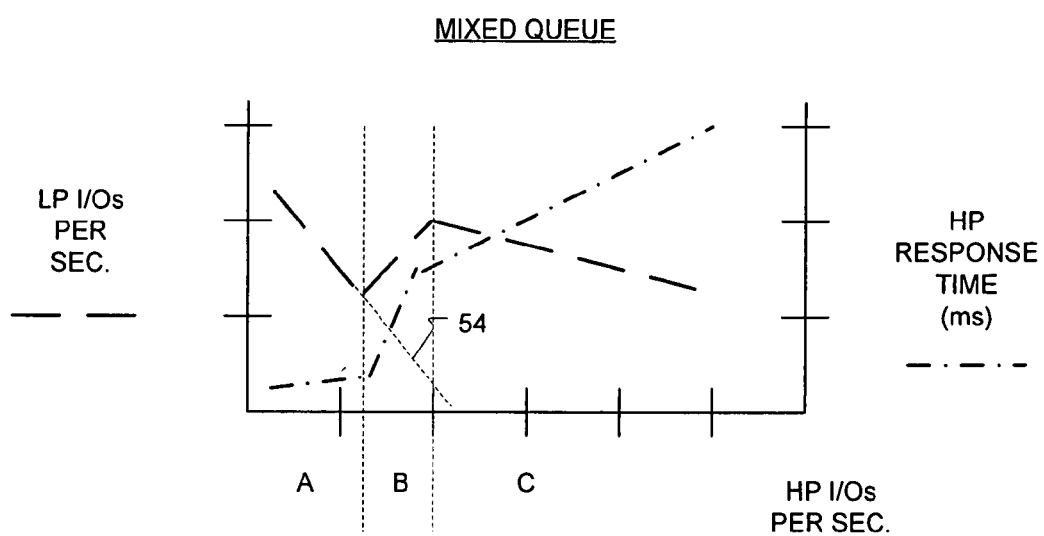
FIG. 9 is a plot showing the dependence of throughput and response time on the rate of high-priority storage requests in a data storage system employing the mixed queuing technique of FIG. 8.

FIG. 9 illustrates the results of experiments with a mixed queue approach when the HP request limit is implemented as a limit of one outstanding HP request. The HP request rate axis is divided into three zones A, B and C as shown. At low HP request rates in zone A, both the HP response time and the LP throughput have values generally following the "two-queue" curves of FIG. 6. In a transition zone B at slightly higher HP request rates, the HP response time increases substantially, while the LP throughput curve transitions upward from its initial steep descent. In zone C of generally high HP request rates, both the LP throughput and HP response time generally follow their respective "one-queue" curves from FIG. 5.

Although the increase in HP response time in zones B and C is substantial, so is the improvement in the LP throughput, as can be appreciated by comparing the actual LP throughput curve of FIG. 9 with its "two-queue" trend as indicated by dotted line 54. At the rightmost end of zone B, for example, the actual LP throughput is nearly equal to its highest value from zone A, whereas in conventional two-queue operation the LP throughput falls to a much lower value. It will be appreciated that the location of the transitions of these curves can be influenced by how the HP queue limit is realized. In alternative embodiments it may be desirable, for example, that the HP response time remain low for higher HP request rates than in FIG. 9, at the price of a lower LP throughput value in the vicinity of the transition. It will generally be necessary to model and analyze any specific data storage system to determine how it will behave for different implementations of the HP request limit.

Several approaches to realizing the HP request limit are outlined in the following list and related description below.
1. HP queue length limit—no more than n HP requests outstanding at a time.
2. HP request rate limit—no more than n HP requests issued in m milliseconds.
   a) Ratio n/m determined by LP queue length
   b) Ratio n/m adjusted by values depending on LP queue length
3. HP request proportion limit—for every n HP requests placed on HP queue, m HP requests are placed on the LP queue, where n and m are determined by LP queue length.

For approaches 1, 2(a) and 3, the special cases of n=1 may be desirable to utilize in many cases. In 2(a), the ratio n/m is generally inversely related to the LP queue length. For approach 2(b), a technique such as the following may be utilized to adjust the ratio n/m, where QL and QH are predetermined threshold values for the length of the LP queue 28:

If LPQ<QL, increase n/m by predetermined increment (e.g., increase n by 1 or decrease m by 1)
If QL≦LPQ<QH, maintain current n/m
If QH≦LPQ, decrease n/m by predetermined increment (e.g., decrease n by 1 or increase m by 1)

The advantage of approach 2(b) is that it is fully dynamic and self-adjusting. The values of QL and QH are preferably chosen by analysis and/or modeling to yield desirable operational behavior. In one embodiment, values of QL=5 and QH=20 may be used. During operation, the value of n/(n+m) will vary from 0 (n=0, large LP queue length) to 1 (n>>m, small LP queue length).

It is important to note that for approaches 1 and 2 above, an HP request is deemed to be "outstanding" or "issued" regardless of whether it is placed on the HP queue 26 or the LP queue 28. For approach 1 with n=1, for example, an HP request is placed in the LP queue 28 only when there are more than 1 HP requests outstanding to the disk. Similarly for approach 2, what matters for purposes of the HP request limit is the rate at which the HP requests are issued (sent to the disk drive 20) for execution, not which queue (HP or LP) they are placed on.

It is to be understood that the present invention may be embodied in a processor such as the processor 40 with associated memory 42 loaded with queue management code that, when loaded into the memory and executed by the processor, causes the processor to implement the functionality described and claimed herein. It also may be embodied in a computer-readable medium on which such code is stored in a non-volatile manner, for loading into processor memory and execution. In alternative embodiments, the functionality described herein may be executed in whole or part by lower-level control logic such as commonly found in field-programmable gate arrays (FPGAs) and similar logic elements.

It is to be further understood that the above description incorporates specific values for throughput, response time, request rate and other parameters in the interests of clarity and concreteness, but the specific values for any or all of these parameters may be different in alternative embodiments, depending to a large extent on characteristics of the disk drive such as rotational speed, seek speed, and track/bit density.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of managing the queuing of storage requests to a disk drive, the storage requests being divided into high-priority requests and low-priority requests, the high-priority requests generally requiring low response time and the low-priority requests generally requiring high throughput, the method comprising:
   placing each low-priority request on a low-priority request queue, the low-priority request queue being the subject of throughput optimization by which requests on the low-priority request queue are executed by the disk drive in a throughput-optimizing order generally different from the order in which the requests are placed on the low-priority request queue;
   when a high-priority request limit has not been reached, placing a high-priority request on a high-priority request queue, the high-priority request queue being the subject of priority selection such that requests on the high-priority request queue are executed by the disk drive ahead of requests on the low-priority request queue; and
   when the high-priority request limit has been reached, placing the high-priority request on the low-priority request queue such that the high-priority request is included in the throughput optimization along with the low-priority requests on the request queue.

2. A method according to claim 1, wherein the high-priority request limit comprises a predetermined limit on the number of high-priority requests that are outstanding for execution by the disk drive.

3. A method according to claim 2, wherein the predetermined limit on the number of outstanding high-priority requests is one.

4. A method according to claim 1, wherein the high-priority request limit comprises a limit on the rate at which high-priority requests are executed by the disk drive.

5. A method according to claim 4, wherein the rate limit is specified as a predetermined number of high-priority requests over a predetermined time interval.

6. A method according to claim 4, wherein the rate limit is a generally inverse function of the number of entries on the low-priority queue.

7. A method according to claim 1, wherein the high-priority request limit comprises a limit on the proportion of the high-priority requests that are placed on the high-priority queue.

8. A method according to claim 7, further comprising dynamically adjusting the proportion limit as a function of the number of entries in the low-priority queue such that the number of entries in the low-priority queue is maintained within a predetermined desired range.

9. A method according to claim 8, wherein the desired range is between a low queue length QL and a high queue length QH, and wherein dynamically adjusting the proportion limit comprises:
   when the number of entries in the low-priority queue is less than QL, increasing the proportion of the high-priority requests that are placed on the high-priority queue; and
   when the number of entries in the low-priority queue is greater than QH, decreasing the proportion of the high-priority requests that are placed on the high-priority queue.

10. A disk drive adapter for use with a disk drive in a storage system, the disk drive adapter including a processor, memory, and interface logic coupled to the disk drive, the memory being operative to store queue management code, the queue management code being operative when executed by the processor to cause the processor to perform the steps of:
   placing each low-priority request on a low-priority request queue, the low-priority request queue being the subject of throughput optimization by which requests on the low-priority request queue are executed by the disk drive in a throughput-optimizing order generally different from the order in which the requests are placed on the low-priority request queue;
   when a high-priority request limit has not been reached, placing a high-priority request on a high-priority request queue, the high-priority request queue being the subject of priority selection such that requests on the high-priority request queue are executed by the disk drive ahead of requests on the low-priority request queue; and
   when the high-priority request limit has been reached, placing the high-priority request on the low-priority request queue such that the high-priority request is included in the throughput optimization along with the low-priority requests on the request queue.

11. A disk drive adapter according to claim 10, wherein the high-priority request limit comprises a predetermined limit on the number of high-priority requests that are outstanding for execution by the disk drive.

12. A disk drive adapter according to claim 11, wherein the predetermined limit on the number of outstanding high-priority requests is one.

13. A disk drive adapter according to claim 10, wherein the high-priority request limit comprises a limit on the rate at which high-priority requests are executed by the disk drive.

14. A disk drive adapter according to claim 13, wherein the rate limit is specified as a predetermined number of high-priority requests over a predetermined time interval.

15. A disk drive adapter according to claim 13, wherein the rate limit is a generally inverse function of the number of entries on the low-priority queue.

16. A disk drive adapter according to claim 10, wherein the high-priority request limit comprises a limit on the proportion of the high-priority requests that are placed on the high-priority queue.

17. A disk drive adapter according to claim 16, wherein the queue management code is further operative to cause the processor to perform the step of dynamically adjusting the proportion limit as a function of the number of entries in the low-priority queue such that the number of entries in the low-priority queue is maintained within a predetermined desired range.

18. A disk drive adapter according to claim 17, wherein the desired range is between a low queue length QL and a high queue length QH, and wherein dynamically adjusting the proportion limit comprises:

when the number of entries in the low-priority queue is less than QL, increasing the proportion of the high-priority requests that are placed on the high-priority queue; and when the number of entries in the low-priority queue is greater than QH, decreasing the proportion of the high-priority requests that are placed on the high-priority queue.

19. A computer-readable medium containing queue management code to be executed by a processor in a storage system, the queue management code being operative when executed by the processor to cause the processor to perform the steps of:

placing each low-priority request on a low-priority request queue, the low-priority request queue being the subject of throughput optimization by which requests on the low-priority request queue are executed by the disk drive in a throughput-optimizing order generally different from the order in which the requests are placed on the low-priority request queue;

when a high-priority request limit has not been reached, placing a high-priority request on a high-priority request queue, the high-priority request queue being the subject of priority selection such that requests on the high-priority request queue are executed by the disk drive ahead of requests on the low-priority request queue; and when the high-priority request limit has been reached, placing the high-priority request on the low-priority request queue such that the high-priority request is included in the throughput optimization along with the low-priority requests on the request queue.

\* \* \* \* \*